United States Patent [19]

Lapierie

[11] Patent Number: 5,293,902
[45] Date of Patent: Mar. 15, 1994

[54] QUICK-DISCONNECT FLUID COUPLING

[75] Inventor: George W. Lapierie, Ft. Lauderdale, Fla.

[73] Assignee: TIF Instruments, Inc., Miami, Fla.

[21] Appl. No.: 73,334

[22] Filed: Jun. 7, 1993

[51] Int. Cl.5 .............................................. F16L 37/28
[52] U.S. Cl. ................................. 137/614.04; 251/149.6
[58] Field of Search ................. 251/149.6; 137/614.04

[56] References Cited

U.S. PATENT DOCUMENTS

| | | | |
|---|---|---|---|
| 3,199,831 | 10/1965 | Sully | 251/149.6 |
| 3,625,251 | 12/1971 | Nelson | 137/614.04 |
| 3,715,099 | 2/1973 | Shendure | 251/149.6 |
| 4,476,892 | 10/1984 | Boyce | 251/149.6 |
| 4,892,117 | 1/1990 | Spalink et al. | 137/614.03 |
| 4,921,013 | 5/1990 | Spalink et al. | 137/614.05 |
| 5,005,375 | 4/1991 | Manz et al. | 62/292 |
| 5,074,332 | 12/1991 | Jones | 137/614.06 |
| 5,076,324 | 12/1991 | Herman et al. | 137/614.06 |
| 5,080,132 | 1/1992 | Manz et al. | 137/614.04 |
| 5,139,049 | 8/1992 | Jensen et al. | 137/614.05 |

FOREIGN PATENT DOCUMENTS 1272472  8/1961  France.

*Primary Examiner*—A. Michael Chambers
*Attorney, Agent, or Firm*—Stephen A. Gratton; Kevin Fortin

[57] ABSTRACT

A quick-disconnect coupling engageable with a fluid fitting is disclosed. The coupling includes a body formed with a cylindrical bore. Within the bore, a valve pin is reciprocally mounted. The valve pin is biased in a closed position by a spring in combination with a threaded set screw which are positioned in the bore in axial alignment with the valve pin. The set screw is rotatable to adjustably compress the spring and adjustably bias the valve pin.

16 Claims, 3 Drawing Sheets

QUICK-DISCONNECT FLUID COUPLING

FIELD OF THE INVENTION

The invention relates generally to fluid system couplings. More specifically, this invention relates to self sealing quick disconnect couplings for use in automotive air conditioning systems.

BACKGROUND OF THE INVENTION

Until recently, the environmentally harmful CFC(R-12) type refrigerant fluid was commonly used in automotive air conditioning systems. In 1991, however, the automotive industry introduced new air conditioning systems which employ a relatively less harmful HFC-134a type refrigerant. The newer HFC systems include specifically designed access fittings.

These access fittings typically include a permanent fluid fitting located on the air conditioning system, as a charging/access port, and a quick disconnect coupling for removeable connection to the permanent fluid fitting. The permanent fluid fitting is formed as a Schroeder-type valve which permits recharging, purifying or recovering of the refrigerant in the system and also fluid pressure measurements to be made. The quick disconnect coupling is typically attached to a flexible hose and to a supply or evacuation cannister for the refrigerant. As an example, for recharging an automotive air conditioning system with refrigerant, a quick disconnect fluid coupling, attached to a supply cannister of refrigerant, is sealingly connected to the permanent fluid fitting of the system.

In general these access fitting (i.e. permanent fluid fitting/quick disconnect coupling) differ in size from the access fittings used in the older CFC systems. Because of this difference, CFC refrigerant can not be accidently introduced into a newer system containing the HFC type refrigerant. This prevents the cross-mixing of refrigerants and lubricants which may damage an air conditioning system.

Standards for the HFC access fittings have been defined by the Society of Automotive Engineers (SAE). Under these standards the access fittings must be adapted for quick coupling and uncoupling. In addition, the access fittings must be designed to prevent discharge of the refrigerant into the atmosphere during coupling and uncoupling.

In order to satisfy these criteria, many quick disconnect couplings, suitable for use with the newer air conditioning systems, were designed with a manually rotatable screw type valve, for controlling fluid flow through the coupling. With such a manual flow control valve, the quick disconnect coupling can be sealed prior to connection or disconnection from the fluid fitting for the system. An example of this type of coupling is disclosed in U.S. Pat. No. 5,139,049 to Jensen et al., which is assigned to Aeroquip Corporation.

A major disadvantage of quick disconnect couplings having such a manually actuated flow control valve, is that the valve handle is sometimes difficult to operate in tightly enclosed spaces. In automotive applications where space is limited, this is a serious disadvantage. Specifically, the user of the quick disconnect coupling will be inconvenienced by having to rotate the valve handle until the flow control valve of the coupling is desirably positioned. Additionally, such couplings do not automatically seal upon uncoupling. Should the user therefore, forget to close the flow control valve of the coupling during uncoupling, some refrigerant may escape into the atmosphere.

For convenient use even in tightly enclosed spaces, quick disconnect couplings having self-sealing valves have been developed. The self-sealing couplings generally employ an internal Schroeder type flow control valve mounted within the coupling. Normally, the flow control Schroeder valve is urged into a closed position by a spring. During connection with a fluid fitting of a refrigeration system, the valve stem of the Schroeder valve and the mating parts of the fluid fitting are placed into contact. This opens the Schroeder and permits fluid flow through the coupling. Upon uncoupling the spring closes the flow control Schroeder valve to prevent the flow of any fluid through the coupling. U.S. Pat. No. 5,080,132 to Manz et al. discloses such a self sealing quick disconnect coupling.

A problem associated with the above described self-sealing couplings is that the flow control valve incorporated into the coupling may open prematurely during connection with a fluid fitting allowing refrigerant to escape. This may happen when the valve pin of the flow control valve for the coupling is actuated by the mating parts of the fluid fitting before the fluid fitting is sealingly engaged with the coupling. Furthermore, the flow control valve may not close quickly enough to prevent the discharge of refrigerant into the atmosphere during uncoupling of the coupling. In addition, high pressure developed within the coupling may cause the coupling to be blown apart from the fluid fitting causing injury to the user and to the coupling.

In view of the shortcomings of the prior art, the present invention is directed to a self-sealing, quick-disconnect coupling which can be safely operated and with minimal fluid loss during coupling and uncoupling. Accordingly, it is an object of the present invention to provide a quick-disconnect coupling that is self-sealing to prevent fluid loss during coupling and uncoupling. It is a further object of the present invention to provide a quick-disconnect coupling having an integral flow control valve formed with an adjustable valve pin for improved sealing during coupling and uncoupling to a fluid fitting. It is yet another object of the present invention to provide a quick-disconnect coupling which is relatively small in size and safe and convenient to use, even in tightly enclosed spaces.

SUMMARY OF THE INVENTION

In accordance with the present invention a quick-disconnect, self-sealing, fluid coupling for a refrigeration system is provided. The coupling is adapted for coupling to a Schroeder-type fluid fitting such as those used in newer automotive air conditioning systems which employ an HFC type refrigerant. The coupling, generally stated, includes a ball retainer (i.e. coupler) for quick connection to the fluid fitting; a threaded passageway for a threaded connection to a flexible conduit (e.g. flexible refrigeration hose); and an adjustable valve pin for automatically controlling fluid flow through the coupling.

More specifically, the coupling includes a generally cylindrically shaped body formed with an axial bore. Within the axial bore, an o-ring seal is contained within an annular groove for sealing around the periphery of the fluid fitting upon coupling. The threaded passageway extends radially through the body to the axial bore for engaging a threaded adapter of the flexible conduit and establishing fluid communication between the flexible conduit and the axial bore. A valve pin is reciprocally mounted within the axial bore for controlling fluid flow through the axial bore and thus through the passageway to the flexible conduit.

The valve pin is normally biased in a closed position by a compression spring which is aligned with and compressed against the valve pin. In the closed position an o-ring attached to the valve pin cooperates with a reduced diameter portion of the axial bore to effect a seal. The location of the valve pin is adjustable by a set screw. The valve pin can thus be biased into an optimal sealing arrangement within the axial bore to prevent fluid from escaping during coupling and uncoupling.

Upon coupling with the fluid fitting, the valve pin is moved from a closed position in which fluid flow is prevented to an open position in which fluid flow is permitted through the bore. The coupling is formed with an open end having smooth contoured walls to precisely guide the coupling into sealing engagement with the fluid fitting and the fluid fitting into mating engagement with the valve pin. A ball retainer is reciprocally mounted on the coupling for quickly locking and unlocking the coupling to the fluid fitting.

When the coupling is inserted over the fluid fitting of the refrigeration system, the mating parts of the fluid fitting will urge the valve pin into an open position to establish fluid communication between the fluid fitting and the coupling. When the coupling is removed from the fluid fitting the valve pin is shifted to a closed position by the adjustable spring. This prevents fluid from escaping during coupling and uncoupling of the coupling with the fluid fitting.

These and other objects, features and advantages of the invention will be apparent from the following more particular description of the preferred embodiments of the invention as illustrated in the accompanying drawing.

DESCRIPTION OF THE PREFERRED EMBODIMENT

Figure 1:
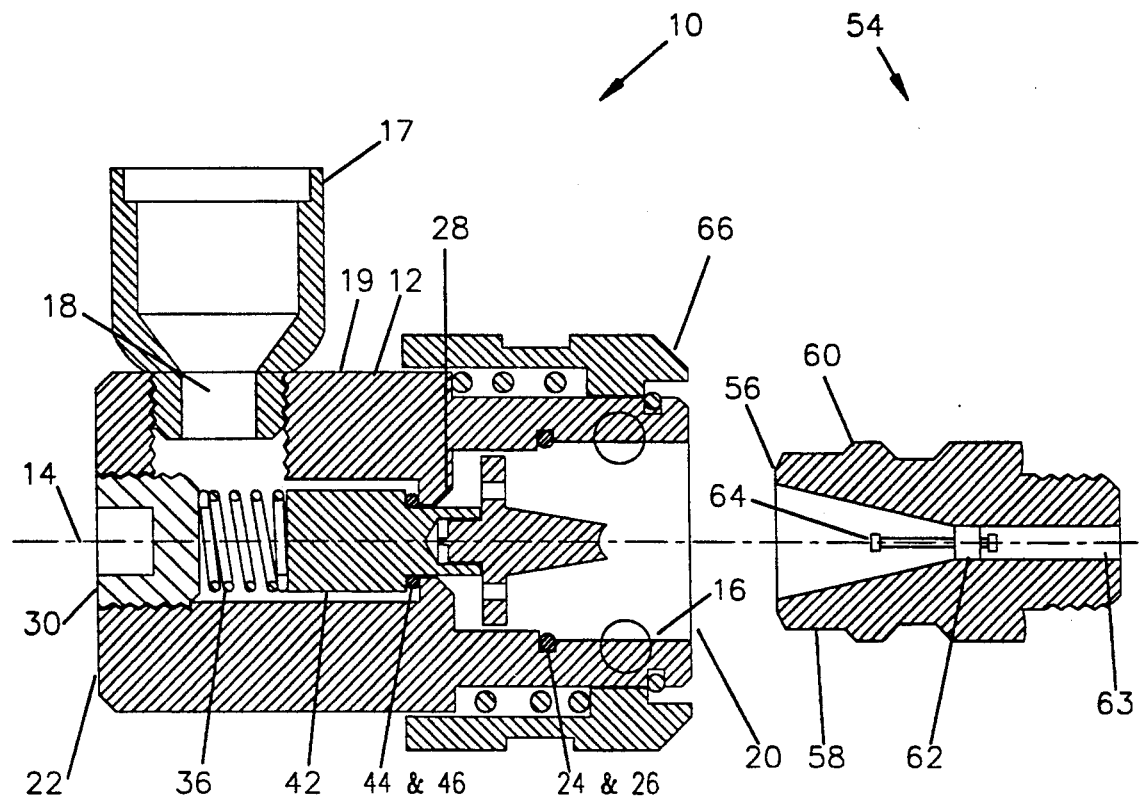
FIG. 1 is a cross sectional view of a quick disconnect coupling constructed in accordance with the invention and shown in a closed position prior to coupling with a fluid fitting of a refrigeration system and prior to connection with a threaded adapter of a flexible conduit.

With reference to FIG. 1, a quick disconnect coupling 10 constructed in accordance with the invention is shown. The quick disconnect coupling includes a body 12, which is of a generally cylindrical configuration. An axial bore 16 having smooth generally cylindrical walls is formed along a longitudinal axis 14 of the body 12. A generally cylindrical passageway 18 is also formed within the body 12 and extends in a radial direction from the longitudinal axis 14 of the body to an exterior surface 19 of the body 12. The axial bore 16 and cylindrical passageway 18 are connected in fluid communication. A portion of the passageway 18 is threaded for connection to a threaded adapter 17. The threaded adapter 17 is adapted for connection to a flexible fluid conduit (not shown) such as a refrigerant supply hose to permit charging or evacuation of a liquid refrigerant through the coupling 10.

The axial bore 16 is formed with an open end 20 and an opposing closed end 22. An annular shoulder 28 is positioned adjacent to the open end 20 of the axial bore 16 and is aligned coaxially with the axial bore 16. The annular shoulder 28 is formed with smooth cylindrical walls and a relatively smaller inner diameter than the diameter of the open end 20 of the axial bore 16.

An annular groove 24 is formed within the axial bore 16 coaxial to the axial bore 16. The annular groove 24 is situated between the open end 20 and the annular shoulder 28 and is adapted to hold an annular seal 26. The seal 26 is pressed within the annular groove 24 and may be a resilient o-ring or other means well known in the art. The seal 26 extends in a radial direction inward towards the axis 14 of the axial bore 16 to protrude beyond the cylindrical surfaces of the annular shoulder 28 and open end 20 of the axial bore 16. Accordingly, visual inspection of the annular seal 26 is possible from the open end 20 of the axial bore 16.

A set screw 30 is formed with a first end 32 and a second end 34. The first end 32 of the set screw 30 includes a depression 33 which is formed for engagement with a hex wrench, screwdriver or other means well known for rotating set screws. The set screw 30 is in threaded engagement with the closed end 22 of the body 12 and extends along the axis 14 of the axial bore 16 into the axial bore 16 so that the second end 34 of the set screw 30 adjustably intrudes into the axial bore 16 and abuts the spring 36. The spring 36 is positioned along the axis 14 of the bore 16 within the bore 16. The spring 36 may be formed as a helical compression spring or as an axially compressible resilient member. A first end 38 of the spring 36 abuts the set screw 30. A second end 40 of the spring 36 abuts the valve pin 42. As is apparent the set screw 30 is manually rotatable to adjustably compress the spring 36.

A valve pin 42 is reciprocally positioned within the axial bore 16 so that the set screw 30, spring 36 and valve pin 42 are respectively aligned in an end-to-end formation. The valve pin 42 includes a cylindrical midsection having an annular groove 44 formed therearound. An o-ring 46 is held within the groove 44.

It can be appreciated that any rotation of the set screw 30 will cause the set screw 30 to linearly translate along the axis 14 of the axial bore 16. Such linear movement will urge the second end 34 of the set screw 30 against the first end 38 of spring 36 to cause the spring 36 to either compress or extend. In this way, a variable force can be applied by the spring 36 against the valve pin 42 to adjustably bias the valve pin 42 toward the open end 20 of the axial bore 16.

In the closed position, the valve pin 42 is urged by the spring 36 against the shoulder 28 and the o-ring 46 is deformed to create a facial seal between the valve pin 42 and the shoulder 28. A radial seal is also created between the cylindrical mid-section of the valve pin 42 and the axial bore 16 by the deformation of the o-ring 46. The deformation of the o-ring 46 and the resulting sealing arrangement are adjustable in response to the force applied to the valve pin 42 by the spring 36. Thus, the seal created by the o-ring 46 can be optimized by adjustment of the set screw 30.

Figure 3:
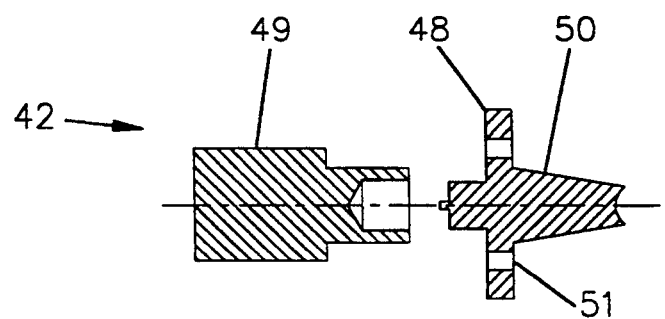
FIG. 3 is an exploded cross-sectioned view of an alternate embodiment of a valve pin component for the quick disconnect coupling shown in FIGS. 1 and 2.

As seen in FIG. 3, the valve pin 42 is formed with a disk shaped base 48 having a piston 49 attached in coaxial alignment with the spring 36 to abut the second end 40 of the spring 36. Opposite to the piston 49 on the base 48, a generally conically shaped extension 50 is formed having a flattened tip extending from the base 48.

Referring back again to FIG. 2, a ball retainer 66 is reciprocally mounted to circumscribe the body 12 of the coupling 10. The ball retainer 66 is displaceable between a locked and an unlocked position for coupling the body 12 to fluid fitting 54. The ball retainer 66 normally supports radially displaceable balls 68, but, the balls 68 are radially freed when the ball retainer is manually reciprocated into the unlocked position. Such an arrangement is well known in the art.

A spring 70 is interposed between the body 12 and the ball retainer 66 and biases the ball retainer 66 into the locked position. An annular ring 72 is locked about the body 12 and circumscribes the open end 20 of the axial bore 16 to limit movement of the ball retainer 66 and laterally support the balls 68 when the ball retainer 66 is in the unlocked position.

To couple or uncouple the coupling 10 with the fluid fitting 54, the ball retainer 66 is manually reciprocated along the body 12 away from the closed end 20 into the unlocked position. The peripheral configuration of the end 58 of the fluid fitting 54 conforms to the internal contour of the axial bore 16 at its open end 20. Thus, when the coupling 10 is inserted over the fluid fitting 54, the fluid fitting 54 is precisely guided into a sealing arrangement by the contoured cylindrical walls of the axial bore 16.

Figure 2:
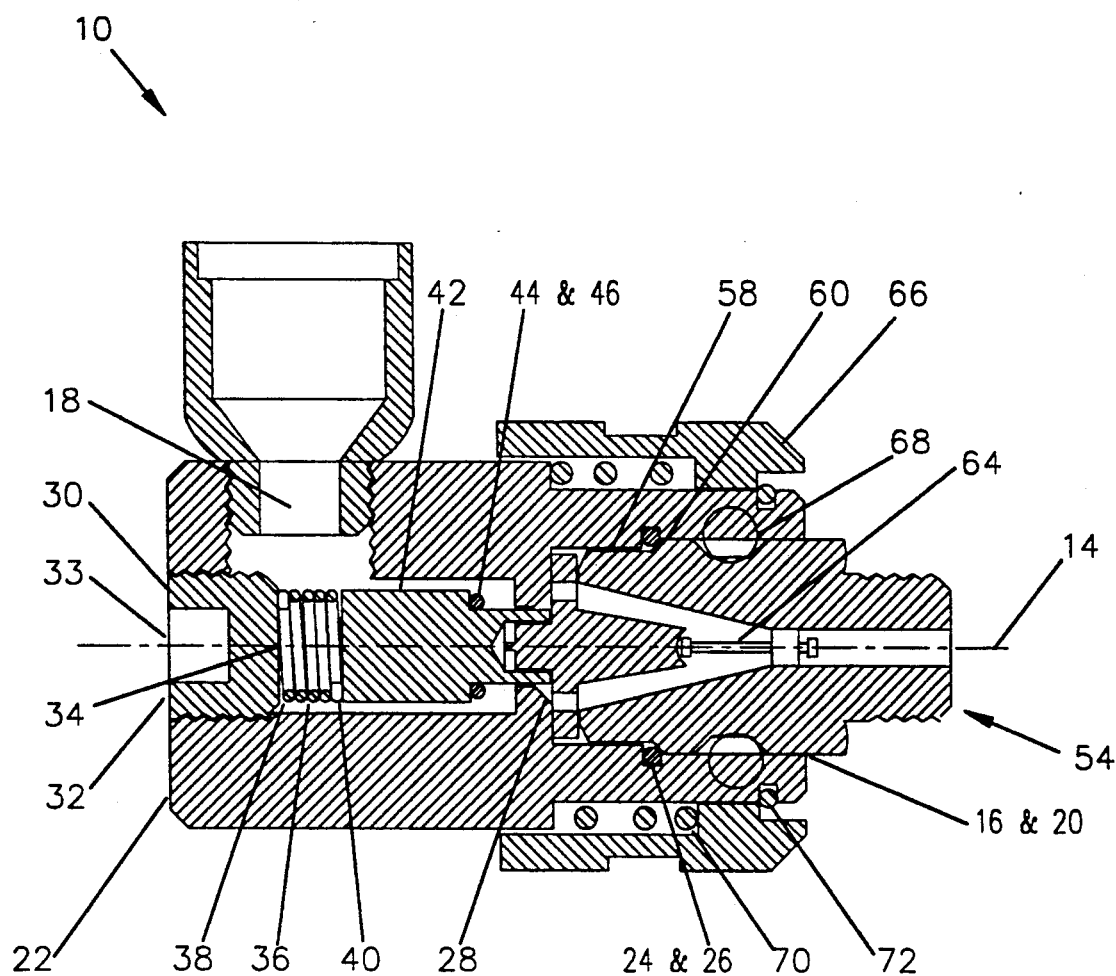
FIG. 2 is a cross sectional view similar to FIG. 1 showing the quick disconnect coupling in an open position and coupled to the fluid fitting.

Referring now to FIG. 2, the coupling 10 is shown coupled to the fluid fitting 54 in an open position. During interconnection, the end 56 of the fluid fitting 54 will first contact the annular seal 26 to facially seal the end 56 against the shoulder 28 of the axial bore 16. As the coupling 10 is moved further over the fitting 54, the periphery 58 of the fluid fitting 54 will contact the innermost surface of the seal 26 forming a radial seal between the bore 16 and the periphery 58. During this movement, the Schroeder valve stem 64 of the fitting 54 is precisely aligned with the valve pin 42 of the coupling 10 by the smooth cylindrical walls of the bore 16. After the radial seal between the axial bore 16 and the periphery 58 of the fitting 54 is formed, the relative axial movement between the fluid fitting 54 and the coupling 10 will cause the valve pin 42 to urge the Schroeder valve 62 open. The valve pin 42 will also be axially displaced, and will be moved toward the spring 36 by the action of the Schroeder valve stem 64. This displacement will cause the o-ring 46 to disengage from the shoulder 28 of the axial bore 16. Fluid communication will thus be established between the fluid fitting 54, the axial bore 16, and the passageway 18 to the flexible conduit (not shown).

The fluid fitting 54 may then be fully inserted into the axial bore 16 to form a facial seal between the shoulder 28 and a peripheral ridge 60 of the fluid fitting 10. This facial seal forms along with the radial seal between the periphery 58 of the fluid fitting 54 and the axial bore 16. The ball retainer 66 may then be reciprocated into a locking position by the extension of the spring 70 to lock the balls 68 about the fluid fitting 54.

During uncoupling, the coupling 10 and fluid fitting 54 are drawn axially apart. During uncoupling, the valve pin 42 will be urged by the spring 36 back into closed position to prevent fluid flow. The Schroeder valve 62 in the fluid fitting 54 will also close. The relative sequence of the closing of the Schroeder valve 62 and the closing of the valve pin 42 is adjustable depending on the force applied on the valve pin 42 by the spring 36. Both the valve pin 42 and Schroeder valve 62, however, will close prior to disconnection of the sealing arrangement between the fluid fitting 54 and the axial bore 16 of the coupling 10. Thus, fluid escape during disconnection will be minimized.

It can be appreciated that to prevent fluid loss, selective adjustment of the set screw 33 is advantageous for several reasons. For example, premature opening of the valve pin 42 is prevented by selectively biasing the valve pin 42 so that the valve pin 42 will only be urged open when the fluid fitting 54 is precisely positioned in sealing arrangement with the coupling 10. During periods of non-use, the seal between the valve pin 42 and the bore 16 may be precisely adjusted for optimal sealing. During periods of fluid flow through the coupling 10, it can be further appreciated that flow resistance caused by the valve pin 42 can also be controlled by selective adjustment of set screw 33. In this way, the fluid flow may also be regulated.

Thus the invention provides a simple yet effective quick disconnect coupling for refrigeration systems in which fluid flow through the valve is automatically regulated by an adjustable valve pin. While the invention has been described with reference to a preferred embodiment thereof, as will be apparent to those skilled in the art, certain changes and modifications can be made without departing from the scope of the invention as defined by the following claims.

I claim:

1. A quick disconnect coupling for connection to a fluid fitting, having a Schroeder valve, said coupling comprising:

a body formed with an axial bore and a passageway in communication with said bore, said bore formed with an open end to receive said fluid fitting therewithin and an annular shoulder;

an annular seal within said bore mounted in a groove formed in said body for sealingly engaging an outside diameter of said fluid fitting upon receipt of said fluid fitting;

a locking means for removably attaching said body to said fluid fitting and for maintaining contact of said annular seal with a ridge portion of said fluid fitting said locking means reciprocally attached to said body;

a single valve pin reciprocally mounted within said axial bore for movement between a closed position wherein said valve pin engages said annular shoulder of said bore to create a seal and prevent communication between said open end and said passageway, and an open position wherein communication is permitted, said valve pin being moveable in response to engagement with said fluid fitting, said valve pin including an extension for contacting and opening the Schroeder valve and a base portion for contacting said fluid fitting and for limiting penetration of said extension into said fluid fitting; and a biasing means connected with said body and said valve pin for adjustably biasing said valve pin into said closed position.

2. A device as recited in claim 1, wherein said biasing means comprises a spring enclosed within said bore in axial alignment with said valve pin for urging against said valve pin and biasing said valve pin in said closed position, said biasing means further comprising a set screw in threaded engagement with said body and extending axially within said bore to adjustably urge against said spring.

3. A device as recited in claim 2, wherein said locking means is a ball retainer circumscribing said body, said locking means being biased in a locked position by a retainer spring interposed between said body and said ball retainer, said locking means further comprising an annular retaining ring locked about said body to limit movement of said locking means.

4. A device as recited in claim 2, wherein said set screw, said spring and said valve pin are respectively aligned in an end-to-end arrangement.

5. A quick disconnect coupling for connection to a fluid fitting having a Schroeder valve said coupling comprising:
a cylindrical body having an axial bore with an annular shoulder, a passageway in communication with said bore and an open end in communication with said bore to receive said fluid fitting;
an annular seal mounted in an annular groove within said bore for sealing against an outside diameter of said fluid fitting upon receipt of said fluid fitting and for contacting a ridge portion of said fluid fitting to form a seal;
a locking means for locking and unlocking said fluid fitting from said body, said locking means being reciprocally attached to said body and adapted to maintain said ridge portion in contact with said annular seal;
a single valve pin reciprocally mounted within said axial bore for movement between a closed position wherein said valve pin sealingly engages said annular shoulder and fluid communication through said bore is prevented and an open position wherein fluid communication through said bore is permitted, said valve pin including an extension for contacting and opening the Schroeder valve and a base portion for contacting and limiting penetration of said extension into said fluid fitting;
a threaded set screw mounted in axial alignment on said body and extending to within said bore; and
a spring mounted in axial alignment within said bore and positioned in abutting engagement between said valve pin and said set screw for biasing said valve pin toward said closed position in response to rotation of said set screw.

6. A device as recited in claim 5, wherein said valve pin is formed having a disk shaped base attached to a piston and a conical shaped extension formed opposite said piston on said base, said base being engageable with said shoulder, sad fluid fitting being engageable with said conical shaped extension, and said piston being aligned with said bore to abut said spring.

7. A device as recited in claim 5, wherein said locking means is a ball retainer biased in a locked position by a ball retainer spring interposed between said body and said ball retainer, said locking means further comprising an annular retaining ring engaged about said body to limit movement of said locking means.

8. A device as recited in claim 5, wherein a portion of said body defining said passageway is threaded for engagement with a threaded adapter.

9. A device as recited in claim 5, wherein said annular seal extends radially inward from said body to protrude from the surface of said bore to allow visual inspection of said annular seal and for improved sealing.

10. A device as recited in claim 5, wherein said valve pin includes a cylindrical mid-section having an annular groove formed thereabouts for holding an o-ring, said o-ring being deformable against said shoulder to create a seal between said valve pin and said shoulder when said valve pin is in said closed position.

11. A quick disconnect coupling for connection to a fluid fitting, having a Schroeder valve and a peripheral ridge portion, said coupling comprising:
a body having an axial bore, a passageway situated perpendicular to said bore within said body and being engageable with a threaded adapter, said bore having a closed end and an open end for receiving said fluid fitting;
an annular seal positioned within said bore in an annular grove formed within said bore between said open end and an annular shoulder, said shoulder being formed within said bore adjacent said open end and having a relatively smaller inner diameter than said open end, such that upon receipt of said fluid fitting, said annular seal is positioned between said fluid fitting and said annular groove in said bore in contact with said peripheral ridge portion of said fluid fitting to create a radial seal therebetween;
a single valve pin reciprocally mounted within said bore for movement between a closed position and an open position, said valve pin including an extension for contacting and opening the Schroeder valve and a base portion for limiting penetration of said extension into said fluid fitting, said valve pin reciprocating in response to contact with said fluid fitting;
a compressible spring for biasing said valve pin in said closed position, said spring being positioned in axial alignment within said bore and having a first end abutting a threaded fastens which is engaged with said closed end of said body and a second end abutting said valve pin to urge said valve pin into said closed position, said valve pin being adjustably biasable in response to rotation of said set screw; and
a locking means for locking said body to said fluid fitting with said peripheral ridge portion of said fluid fitting engaging said annular seal.

12. A device as recited in claim 11, wherein said valve pin is formed with a cylindrical mid-section having an annular groove formed thereabouts for holding an o-ring, said o-ring engageable with said shoulder when said valve pin is in said closed position to prevent fluid flow past said valve pin and through said coupling.

13. A device as recited in claim 11, further comprising a locking means for locking said body to said fluid fitting, said locking means being reciprocally mounted on said body and biased into a locked position by a retainer spring interposed between said body and said locking means.

14. A device as recited in claim 11, wherein said passageway is formed having a threaded surface for connection with a threaded adapter.

15. A device as recited in claim 11, wherein said set screw is formed with a depression for connection to a hex wrench.

16. A device as recited in claim 12, wherein said open end is formed with smooth cylindrical walls for precisely guiding said fluid fitting into a sealing arrangement against said shoulder.

* * * * *